C. S. WRAY.
BELT CONVEYER.
APPLICATION FILED MAY 7, 1919.
1,353,008.
Patented Sept. 14, 1920.
2 SHEETS—SHEET 2.
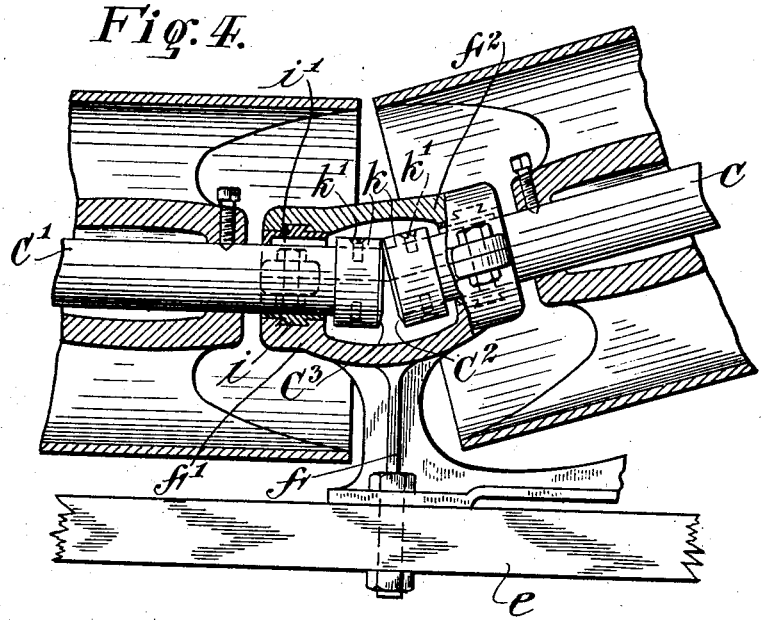
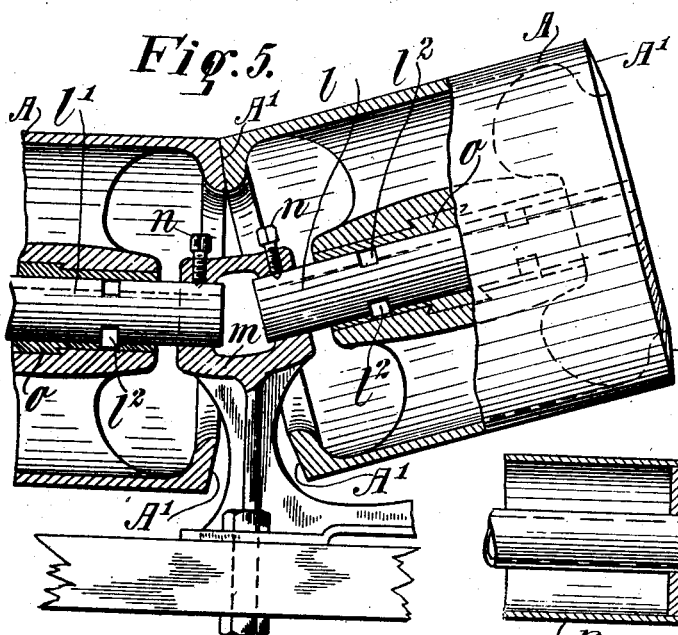
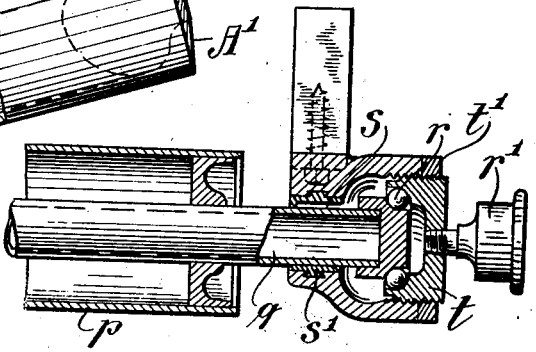
INVENTOR
Charles S. Wray
BY
ATTORNEYS

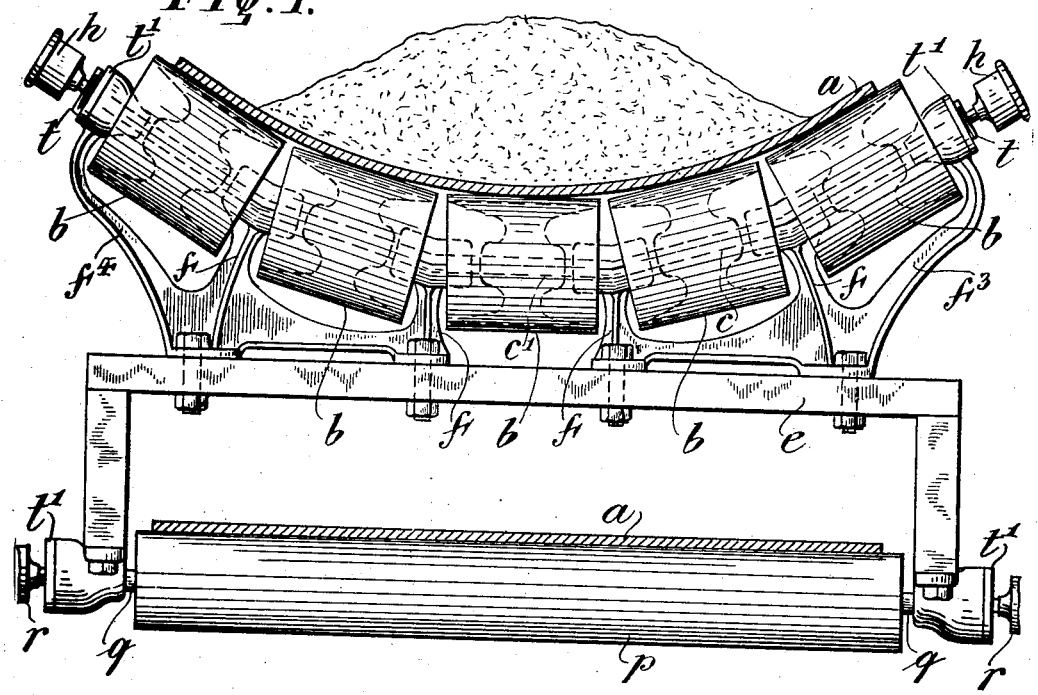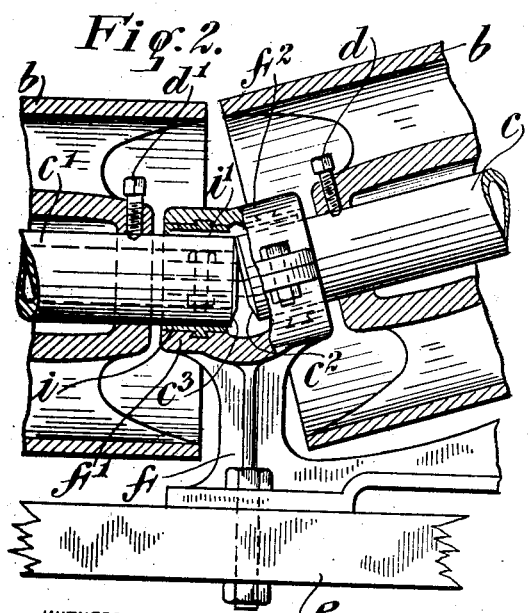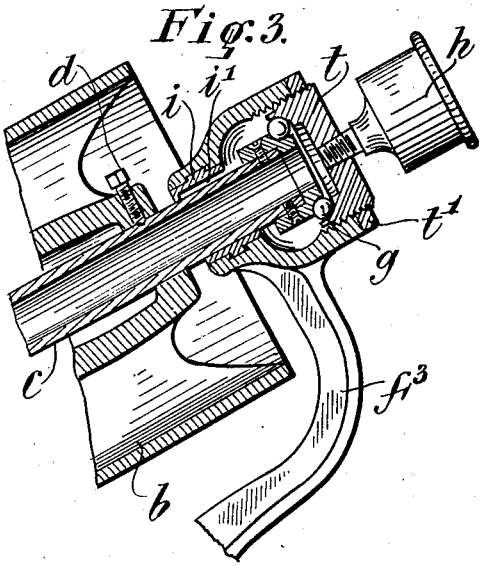

UNITED STATES PATENT OFFICE.

CHARLES S. WRAY, OF NEW YORK, N. Y.

BELT CONVEYER.

1,353,008.  Specification of Letters Patent.  Patented Sept. 14, 1920.

Application filed May 7, 1919. Serial No. 295,329.

*To all whom it may concern:*

Be it known that I, CHARLES S. WRAY, a citizen of the United States, residing in the borough of Manhattan of the city of New York, in the State of New York, have invented certain new and useful Improvements in Belt Conveyers, of which the following is a specification, reference being had to the accompanying drawings, forming a part hereof.

Belt conveyers now in use generally have the supporting idler pulleys for the belt journaled in standards in which are carried thrust bearings for each such pulley. It has been determined that the frictional losses at these bearings are relatively great and it is the primary object of the invention to support the idler pulleys in such a manner that the power dissipated in the axial thrust of the supporting pulleys is greatly reduced. It is a further object of the invention to provide an improved method of lubricating the supporting bearings for the idler rolls. These objects and others which will appear hereinafter are realized without entailing the addition of any parts and in such manner that the rolls may be readily mounted and demounted. Reference is to be had to the accompanying drawings for a detailed description of the invention, in which:

Figure 1 is a view in elevation of one set of supporting idler pulleys of improved construction, the conveyer belt being shown in cross section.

Fig. 2 is a detailed fragmentary, sectional view on a somewhat larger scale showing the relation of two adjacent pulleys and their supporting shafts.

Fig. 3 is a detail fragmentary, sectional view of one of the end pulleys of a series showing the end thrust bearing for the series.

Fig. 4 is a view similar generally to Fig. 2, but showing a somewhat modified construction of the abutting shafts.

Fig. 5 is a fragmentary sectional view of a different embodiment of the invention in which the adjacent rolls bear against each other.

Fig. 6 is a fragmentary, sectional view showing the end thrust bearing for the return pulley of the belt.

The belt conveyer $a$ is shown in Fig. 1 as supported in trough-like form on a plurality of idler rolls $b$, five such rolls being shown in the series in the drawings. These idler rolls are each secured to a hollow tubular shaft, two such adjacent shafts $c$, $c'$, being illustrated in Fig. 2 and shown in that relation to one another, which each pair of adjacent shafts will occupy in the series of pulleys. The rolls $b$ are shown as secured to the shaft sections $c$, $c'$ by means of screws $d$, $d'$, respectively, but it will be understood that this or equivalent methods of so securing each of the rolls to its shaft may be employed. On the supporting base $e$ for the belt conveyer are secured a plurality of standards $f$ which carry at their upper ends split bearings $f'$ provided with bearing caps $f^2$, these caps being removable. By this construction it will be evident that the intermediate standards $f$ carry a bearing which serves for the proximate ends of two adjacent shafts of the rolls in the series. In the embodiment shown in Fig. 2 the proximate ends of two such shafts $c$, $c'$, are illustrated as provided with beveled ends $c^2$, $c^3$, respectively, these bevels being of such pitch as to afford proper abutment along the faces thereof between the said shafts, taking into account the angular relation of the shafts. The end standards $f^3$, $f^4$ as shown particularly in Fig. 3, carry at their upper ends an end thrust bearing illustrated as a ball bearing $g$. Each of these end thrust bearings also carries a suitable container $h$ for a lubricant, illustrated as a grease cup.

From the construction described, it will be evident that all of the idler pulleys $b$ in the series rotate with the shafts at the same speed, under the influence of the belt $a$ and that the adjacent shafts bear against each other along the beveled ends $c^2$, $c^3$. Since the pulleys and their shafts rotate at the same speed there is no relative motion and accordingly no frictional loss, between the contacting shafts. Any tendency of the belt $a$ to creep will cause an axial thrust along each of the shafts $c$, $c'$ and this axial thrust from each pulley shaft will be transmitted to the next shaft in the series and so on to one or the other of the thrust bearings $g$. The thrust of all of the rolls is thereby applied to a single thrust bearing and since this bearing may be of the most efficient type designed to minimize frictional losses, and may be well lubricated, the total loss of power is greatly reduced from that now present in belt conveyers of a type in which the thrust of each pulley is absorbed by a bearing which is independent of all of the other bearings.

Another feature of the improved construction resides in the convenient means for lubricating all of the intermediate bearings $f'$ of the series. By making the shafts of the pulleys $b$ hollow and affording ample space in each of the bearings $f'$ for the discharge of a lubricant, it becomes possible to force a lubricant from one of the containers $h$ through all of the alined shafts and, incidentally, pack each of the bearings $f'$ with a lubricant at the point where the adjacent shafts $c$, $c'$ are in contact with one another. In addition, if desired, the bearing ring $i$ for each shaft may be provided with a channel $i'$ to receive the lubricant and spread it constantly over the outer surface of the shaft at the point where it is journaled.

In the modified embodiment shown in Fig. 4, corresponding reference characters indicate corresponding elements referred to above, the only change residing in the provision of independent beveled bearing rings $k$ which may be secured to the proximate ends of adjacent shafts C, C' by screws $k'$. These bearing rings $k$ have their proximate edges beveled, as at $C^2$, $C^3$, to afford an easy rolling contact face for the purpose described in connection with the contacting ends of the shaft sections of the embodiment previously described. These rings $k$ may be removed from the ends of the shafts and replaced if necessary. The operation of the conveyer is the same in all respects and all of the advantages described above result from the construction illustrated.

In the embodiment illustrated in Fig. 5 it is proposed to lock the shafts $l$, $l'$ against rotation in the bearings $m$ by means of screws $n$. In this case the idler pulleys A rotate freely on the nonrotatable shafts. The proximate ends of the pulleys A are themselves beveled, as at A', and these beveled sections of adjacent pulleys bear against one another so that the pulleys of the entire series, while floating on their respective shafts transmit all axial thrust thereon to the end pulley of the series. Each end pulley is provided with an end thrust bearing which serves to take up the total thrust from all of the pulleys. The idler rolls in this embodiment may be lubricated by forming slots $l^2$ in the shafts whereby the lubricant may be discharged therethrough directly on to the bearing $o$ of each of the pulleys. The lubricant, as heretofore described, may be passed down through the hollow shafts through the end shaft section.

The return idler $p$ for the belt is shown in Fig. 6 as mounted on a tubular shaft $q$ which carries at its end a thrust ball bearing $r$ provided with a grease cup $r'$ whereby a lubricant may conveniently be forced into the bearing and into a channel $s$ provided in the plane supporting bearing $s'$ for the shaft.

A feature common to thrust bearings suitable for use with any of the embodiments illustrated, or equivalent embodiments, resides in the threaded race member $t$ which is screwed into the end bracket $f^3$, $f^4$ and secured therein by means of a locking ring $t'$. This construction facilitates the assembling of the thrust bearings and also permits a ready adjustment thereof after the various shafts have been mounted in their respective bearings in proper relation to each other. The threaded race member $t$ may, as illustrated, afford a convenient support for the lubricant container $h$. A similar thrust bearing construction is illustrated in Fig. 6 in connection with the return roll $p$.

It will be appreciated that the embodiments shown are merely intended to exemplify different applications of the principle employed and that other constructions possessing the advantages of the invention may be designed by a skilled mechanic without departing from the spirit of the invention. The saving in power in the improved conveyer comes from the elimination of separate thrust bearings for the idler rolls by the transmission of all thrust from the pulleys to a single end thrust bearing. It is conceivable that a single thrust bearing for a corresponding purpose may be located at some other part of the series of rolls than at the end thereof. In such case it is likely that such a thrust bearing would absorb the thrust from only a portion of the total number of rolls used.

The scope of the invention will be better defined in the appended claims.

I claim as my invention:

1. In a belt conveyer, idler rolls, means to support each roll, said means being independent of the supporting means for each other roll, a thrust bearing, and means to transmit the thrust of a plurality of said rolls to said thrust bearing.

2. In a belt conveyer, idler rolls, a shaft to support each roll, said shaft being independent of the shaft for each other roll, a thrust bearing, and means to transmit the thrust of a plurality of said rolls to said thrust bearing.

3. In a belt conveyer, idler rolls, a shaft to support each roll, said shaft being independent of the shaft for each other roll, a common bearing for the shafts of each two adjacent rolls, a thrust bearing, and means to transmit the thrust of a plurality of said rolls to said thrust bearing.

4. In a belt conveyer, idler rolls, a hollow shaft to support each roll, said shaft being independent of the shaft for each other roll, a common bearing for the shafts of each two adjacent rolls, a thrust bearing, means to transmit the thrust of a plurality of said rolls to said thrust bearing, and means to force a lubricant through said shafts to each of the bearings.

5. In a belt conveyer, a series of idler rolls, a shaft to support each roll, said shaft being independent of the shaft for each other roll, the proximate ends of adjacent shafts being provided with beveled contact faces for rolling contact between the shafts, a common bearing for the shafts of each two adjacent rolls, and a thrust bearing at the end of the shaft of one of the rolls of the series to receive the thrust from the shafts of a plurality of said series.

6. In a belt conveyer, a series of idler rolls, a hollow shaft to support each roll, said shaft being independent of the shaft for each other roll, the proximate ends of adjacent shafts being provided with beveled contact faces for rolling contact between the shafts, a common bearing for the shafts of each two adjacent rolls, an adjustable thrust bearing at the end of the shaft of one of the rolls of the series to receive the thrust from the shafts of a plurality of said series, and means carried by the thrust bearing to force a lubricant through the shafts to the bearings therefor.

7. In a belt conveyer, a series of idler rolls, a hollow shaft to support each roll, said shaft being independent of the shaft for each other roll and having a beveled contact face formed on its end for contact with a correspondingly beveled contact face on the proximate end of the adjacent shaft, and thrust bearings for the outer ends of each of the shafts of the last rolls of the series to receive the thrust from the shafts of all of the rolls in the series.

This specification signed this 6th day of May, A. D. 1919.

CHARLES S. WRAY.